United States Patent [19]

Kubo

[11] Patent Number: 5,722,502
[45] Date of Patent: Mar. 3, 1998

[54] HYBRID VEHICLE AND ITS CONTROL METHOD

[75] Inventor: Kaoru Kubo, Aichi-ken, Japan

[73] Assignee: Toyota Jidosha Kabushiki Kaisha, Toyota, Japan

[21] Appl. No.: 650,821

[22] Filed: May 20, 1996

[30] Foreign Application Priority Data

May 24, 1995 [JP] Japan ................................. 7-124903
Apr. 23, 1996 [JP] Japan ................................. 8-100895

[51] Int. Cl.$^6$ ........................... B60L 11/12; B60L 11/14
[52] U.S. Cl. ........................... 180/65.4; 180/65.2
[58] Field of Search ........................... 180/65.2, 65.3, 180/65.6, 65.4, 65.8, 69.6

[56] References Cited

U.S. PATENT DOCUMENTS

| | | | |
|---|---|---|---|
| 5,489,001 | 2/1996 | Yang | 180/65.2 |
| 5,495,906 | 3/1996 | Furutani | 180/65.4 |
| 5,562,566 | 10/1996 | Yang | 180/65.6 |

FOREIGN PATENT DOCUMENTS

| | | |
|---|---|---|
| 0 136 055 | 4/1985 | European Pat. Off. . |
| 0 510 582 | 10/1992 | European Pat. Off. . |
| 2-7702 | 1/1990 | Japan . |
| 4-297330 | 10/1992 | Japan . |
| 6-245317 | 9/1994 | Japan . |

OTHER PUBLICATIONS

12th International Electric Vehicle Symposium, pp. 189–200, Dec. 5–7, 1994, J. Mayrhofer, et al., "A Hybrid Drive Based on a Structure Variable Arrangement".

Patent Abstracts of Japan, vol. 18, No. 633 (M-1714), Dec. 2, 1994, JP-A-6 245317, Sep. 2, 1994.

*Primary Examiner*—Josie Ballato
*Attorney, Agent, or Firm*—Oblon, Spivak, McClelland, Maier & Neustadt, P.C.

[57] ABSTRACT

A hybrid vehicle having as a control mode at least a continuous-type parallel series hybrid vehicle (PHV) mode and a series hybrid vehicle (SHV) mode, and a control method thereof. A torque distributing mechanism is provided to distribute the output torque of an internal combustion engine (ICE) to a generator and a motor. A braking mechanism and a clutch are provided in this order between the torque distributing mechanism and the motor. The torque distributing mechanism and the motor are connected by the clutch to keep a power transmission efficiency from the ICE to driving wheels at a high value without depending on the vehicle speed in the continuous-type PHV mode. A battery can be recharged even when the vehicle is not running, by releasing the connection between the torque distributing mechanism and the motor by the clutch. When switching to the SHV mode, the motor side output shaft of the torque distributing mechanism is stopped by the braking mechanism to prevent the ICE from overrunning. An SOC sensor is used to detect the state of charge (SOC), of the battery, and when the SOC is lowered, the control mode is forcedly or automatically switched to the SHV mode. The generated power of the generator is controlled to a very small level to substantiate creeping.

13 Claims, 9 Drawing Sheets

HYBRID VEHICLE AND ITS CONTROL METHOD

BACKGROUND OF THE INVENTION

1. Field of the Invention

This invention relates to a hybrid vehicle (HV) and its control method.

2. Description of the Prior Art

Vehicles which do not run on tracks are conventionally propelled by the power of an internal combustion engine (ICE). However, recently electric vehicles (EVs) which are propelled by electrical power rather than an ICE have been the subject of many studies. Pure EVs (PEVs) are superior to ICE vehicles because PEVs do not use fossil fuels and thus reduce polluting emissions. But, in other aspects, PEVs are inferior to ICE vehicles because they need to have an accumulator, such as a battery or capacitor, for supplying their motors with drive power. This on-board accumulator must have a high capacity (i.e., must be large in size) to drive a high-power motor and must be recharged frequently because it is usually discharged quickly as the vehicle runs.

HVs are vehicles which have multiple types of drive power sources, for example, both an accumulator and an ICE. HVs can be classified into parallel HVs (PHVs), series HVs (SHVs), and parallel series HVs (PSHVs) according to how the drive power sources are combined.

A PHV can have, for example, both an ICE and a dynamo-electric machine as the torque source. A PHV has its ICE mechanically connected to its driving wheels in the same way as a conventional ICE vehicle, but a dynamo-electric machine is added to the shaft which connects the ICE and the driving wheels. The dynamo-electric machine used here is a machine which can serve as both a motor and a generator. In the PHV, the ICE is used to output most of the torque required for propelling the vehicle and the dynamo-electric machine is used to assist the ICE when the total output torque required changes quickly, such as when accelerating or decelerating (e.g., depending on the demand for additional power). As such, by using the dynamo-electric machine for short-term power, the exhaust gas emission from and fuel consumption which is caused by a fast change in ICE power output can be reduced as compared with a conventional ICE vehicle. In a PHV, the on-board accumulator is necessary to drive the dynamo-electric machine as a motor and can, generally, also be used to store power generated when the dynamo-electric machine is operating as a generator. Because of this and the fact that the dynamo-electric machine merely assists the ICE and is not the main drive for the vehicle, the accumulator may be smaller and will require less frequent recharging from an external power source.

A PHV can be represented as "an ICE vehicle which includes a dynamo-electric machine and an accumulator", however, the SHV is more like "an EV which includes a second power source". The second power source can be, for example, a generator driven by an ICE, solar cells for converting sunlight into electric power, or a fuel cell for directly converting the chemical energy of a system consisting of a fluid and an oxidizing substance into electric energy. In the SHV, the drive motor can be driven by both power discharged from the accumulator, in the same way as the PEV, and by power from the second power source, or, alternatively, the power from the second power source can be used to charge the accumulator instead of or at the same time as providing drive power. In other words, the second power source is used, for example, only when the power from the accumulator is insufficient to drive the motor to attain the required torque or when the state of charge (SOC) of the accumulator falls below a certain level. Therefore, an SHV will also emit less exhaust gas than a conventional ICE vehicle and may even have no exhaust gas emissions when the second power source uses solar cells or fuel cells. When the second power source is used as a main electric power source of the motor, and the accumulator is used as auxiliary electric power source, the change in SOC of the accumulator can be suppressed, because the accumulator only provides the shortage or receives the surplus of the second power source output. Further, when the SOC of the accumulator reaches a certain level, the accumulator can be recharged by the output of the second power source, so that the frequency of recharging the accumulator by an external power source will also be lower than for a PEV.

FIG. 8 shows an SHV which has an ICE-driven generator as the second power source and a battery as the accumulator. This drawing shows the invention disclosed in Japanese Patent Laid-Open Publication No. Hei 6-245317 with some modifications. An AC motor 10, has its rotating shaft mechanically connected to driving wheels 14 through a differential gear 12 or the like. The AC motor 10 receives drive power from a battery 18 through a power converter 16 during powered driving, and converts braking energy to electricity and supplies it to the battery 18 through the power converter 16 when braking. The power converter 16 contains circuits which provide both an inverting function for converting the discharged power of the battery 18 from DC to AC and a rectifying function for converting power from the motor 10 from AC to DC, and preferably, also contains some control circuits for controlling the inverter. When the accelerator pedal or the brake pedal is depressed by the vehicle driver, an electronic control unit (ECU) 20 controls the operation of the power converter 16 with reference to the rotation speed of the motor 10 detected by a rotation sensor 22 so that the output torque of the motor 10 corresponds to the pedal angle.

The battery 10 is electrically connected, through a power converter 26, which has at least a rectifying function, to a generator 24 which is driven by an ICE 28. The power generated by the generator 24 is converted from AC to DC by the power converter 26 and is either used to drive the motor 10 or recharge the battery 18. Thus, the battery 18 can be smaller than that used in a PEV and the frequency of recharging the battery 18 by an external power source will be lower than for a PEV. For example, when the battery 18 cannot supply sufficient power to the motor 10 or when the SOC of the battery 18, as detected by SOC sensor 32, is a certain level, the ECU 20 supplies a start signal to a starter 30 to start the ICE 28. When the ICE 28 is operating, the ECU 20 controls the generator 24 so that the rotation speed of the ICE 28, which is detected by a rotation sensor 34, does not vary quickly or substantially, in other words, the ICE 28 is controlled so that emissions and fuel consumption are reduced from even those of a conventional ICE vehicle generating a similar amount of power. At the same time, the ECU 20 controls the power generated by the generator 24 or the rotation speed of the ICE 28 so that the SOC of the battery 18, as detected by the SOC sensor 32, is kept in a prescribed range, so that the SOC of the battery 18 has fewer changes than in that in a PEV. Keeping the SOC within a desired range and making any changes in the SOC small can decrease the frequency of recharging the battery 18 by an external power source and extend the service life of the battery 18.

HVs also include a type which is called a PSHV. The PSHV is a combination of the PHV and the SHV, and can be further classified into some subtypes according to how the two are combined. A changeover-type PSHV has a function to switch the system structure from a PHV structure to a SHV structure, and vice versa, by changing the connection between its components, as shown in FIG. 9. FIG. 9 shows the invention disclosed in Japanese Utility Model Laid-Open Publication No. Hei 2-7702 with some modifications, and uses the same reference numerals as those used in FIG. 8 for comparison with the above-described SHV.

The changeover-type PSHV can be provided by modifying the SHV shown in FIG. 8. In particular, by modifying the mechanical connection so as to connect the rotating shaft of the generator 24 with that of the motor 10 via a clutch 36 and by modifying the control sequence so that the clutch 36 is controlled by the ECU 20 in accordance with a mode command. For example, when a PHV mode command is given from a control panel or the like, the ECU 20 controls the clutch 36 to couple or connect the rotating shaft of the generator 24 to the rotating shaft of the motor 10 and to thereby provide a component connection equivalent to and providing the same advantages as a PHV since the motor 10 and generator 24 can be driven as generator and motor respectively. When an SHV mode command is given, the ECU 20 controls the clutch 36 to release the coupling or connection between the rotating shaft of the generator 24 and that of the motor 10 thereby returning to a component connection equivalent to an SHV. Essentially, the changeover-type PSHV of FIG. 9 is a system which has a high degree of flexibility and usability since the vehicle can be driven in either PHV mode or SHV mode as the vehicle driver desires.

However, the changeover-type PSHV of FIG. 9 has the disadvantage that the clutch operation to switch from SHV mode to PHV mode cannot be performed when the vehicle is not moving or when its speed is low. When travelling in SHV mode, the load on the ICE 28 is essentially just the generator 24 only, while in the PHV mode, the load on the ICE 28 includes the mechanism from the clutch 36 to the driving wheels 14 through the motor 10. Therefore, when switching from SHV mode to PHV mode, the load on the ICE 28 is instantaneously increased and this stepwise increase in the load can cause the ICE 28 to stall, especially when the ICE 28 is idling or running at low speed such as when the vehicle is stationary or travelling at a low speed, i.e., the ICE 28 cannot bear such an instantaneous increase in the load. To prevent the ICE 28 from stalling, switching from SHV mode to PHV mode, i.e., coupling the clutch 36, under such conditions, must be avoided.

This disadvantage causes a bottleneck in extending the period during which the vehicle can operate with the higher power transmission efficiency provided by the PHV mode. The difference in power transmission efficiency is due to the fact that in SHV mode, the output torque of the ICE 28 is first converted into electric power by the generator 24 (mechanical-to-electrical power conversion), and the electric power is then converted into torque by the motor 10 (electrical-to-mechanical power conversion). Since there is a loss at each power mode conversions, the power transmission efficiency from the ICE 28 to the driving wheels 14 is not very good. On the other hand, in PHV mode, the output torque of the ICE is supplied to the driving wheels without making any power mode conversions, so that the power transmission efficiency from the ICE to the driving wheels is substantially higher than that for SHV mode. This advantage of PHV mode is limited to when the vehicle is travelling at a medium or high speed as described above, and thus PHV mode has a limited operating range. In other words, the average power transmission efficiency over a number of periods from vehicle start (key ON) to vehicle stop (key OFF) is low since the operating period in PHV mode is limited.

SUMMARY OF THE INVENTION

A first object of the invention is to provide a PSHV which is capable of recharging its accumulator even when the vehicle is stationary and can supply mechanical power from an ICE to a driving wheel even when the vehicle is stationary or travelling at a low speed. A second object of the invention is to provide a PSHV, based on the accomplishment of the first object, which has the advantages of an SHV, which is capable of suitably controlling the SOC of its accumulator so as to elongate the accumulator's service life and decrease the frequency of recharging, and the advantages of a PHV, which has high power transmission efficiency, regardless of the speed of the PSHV. These objects are achieved by modifying the mechanical connections between the ICE and other components.

A third object of the invention is to provide the first and second objects by means of an independent mechanism which does not require external control. This object is achieved by using a torque distributing mechanism which is connected to an ICE. A fourth object of the invention is to decrease the fuel consumption and emission levels of the ICE, provide more accurate control of the accumulator's SOC, and improve the driving feeling. This object can also be achieved by utilizing the torque distributing mechanism.

A fifth object of the invention is to make the mechanical connection between the ICE and other components modifiable by relatively simple means. A sixth object of the invention is to make the vehicle driving system free from any loads, such as an ICE and ICE-related members, even when driving the vehicle with the ICE stopped. These fifth and sixth objects can be achieved by providing a lock-and-release mechanism such as a clutch.

A seventh object of the invention is to be able to stop any shaft from rotating freely regardless of the state of the lock-and-release mechanism. The object can be achieved by providing a braking mechanism such as a mechanical brake.

An eighth object of the invention is to provide a longer service life and a lower cost by decreasing any noticeable slip or the like of the lock-and-release mechanism and the braking mechanism. This object can be achieved by controlling the rotation speed of the motor.

A first aspect of the invention is a controll method which is implemented in an HV which, at least, comprises an ICE for producing power, first and second dynamo-electric machines, each on a power transmission path from the ICE to a driving wheel, which are electrically connected to each other, and an accumulator electrically connected to the first and second dynamo-electric machines. This control method comprises a first step for determining a control mode to be used from among multiple types of control modes including at lease an SHV mode and a continuous-type PSHV mode, a second step for setting the state of the above components so that the electrical connections and the mechanical connections among the components conform with the control mode determined in the first step, and a third step for controlling the operation of the above components according to the control mode.

A second aspect of the invention is an HV which comprises an ICE for producing power in the form of a torque; a first dynamo-electric machine which is operable at least as a generator; an accumulator which is recharged with a generated power of the first dynamo-electric machine; a second dynamo-electric machine which is operable at least as a motor when supplied with at least one of the generated power from the first dynamo-electric machine and a discharged power from the accumulator; a torque distributing mechanism for differentially distributing the torque produced by the ICE to a side of the first dynamo-electric machine and to the driving wheel and second dynamo-electric machine side; the second dynamo-electric machine assisting the torque supplied from the ICE to the driving wheel when the torque from the ICE is being distributed through the torque distributing mechanism and supplying the driving wheel with torque generated by the second dynamo-electric machine when the torque is not being distributed; a lock-and-release mechanism for mechanically connecting or disconnecting the torque distributing mechanism to or from the second dynamo-electric machine; a braking mechanism for stopping an output shaft, which is one of shafts included in the torque distributing mechanism so that the output shaft does not enter a free running state, the output shaft connecting the torque distributing mechanism to the lock-and-release mechanism and entering the free running state if a mechanical connection between the torque distributing mechanism and the second dynamo-electric machine were released without the stopping; and a controller for changing a control mode of the HV from a continuous-type PSHV mode to an SHV mode by controlling the lock-and-release mechanism and the braking mechanism so that the mechanical connection between the torque distributing mechanism and the second dynamo-electric machine is released and the revolution of the output shaft is stopped.

The SHV mode here means a mode in which the torque produced by the ICE is distributed not to the driving wheel but to the first dynamo-electric machine. More specifically, in this mode, after mechanically disconnecting the ICE and the first dynamo-electric machine from the second dynamo-electric machine and the driving wheel, the torque obtained by operating the second dynamo-electric machine as a motor is used to drive the vehicle, and if necessary, the first dynamo-electric machine is operated as a generator driven by the ICE. Therefore, in SHV mode, the electrical connections and the mechanical connections between the on-board components become equivalent to those of an SHV, and the on-board components (except for components relating to mode switching) can be controlled in the same way as those for an SHV. In the same way as for a conventional SHV, in SHV mode the SOC of the accumulator can be accurately controlled. Therefore, the service life of the accumulator can be made longer, and fuel consumption and emissions can be reduced.

In continuous-type PSHV mode the torque produced by the ICE is distributed to the driving wheel and the first dynamo-electric machine. More specifically, in this mode, after mechanically connecting the ICE and the first dynamo-electric machine to the second dynamo-electric machine and the driving wheel, the torque produced by the ICE is used in a mechanical form to drive the vehicle, and if necessary, the first dynamo-electric machine is operated as a generator, driven by the ICE, and the second dynamo-electric machine is operated as either a motor or a generator. Therefore, in continuous-type PSHV mode, electrical and mechanical connections equivalent to an SHV as well as electrical and mechanical connections equivalent to a PHV are both provided among the on-board components, by sharing the same ICE. Thus, this aspect differs from the changeover-type PSHV, in which the control mode is switched between SHV mode and PHV mode, the HV according to the present invention uses a continuous-type PSHV mode in which connections which partially represent connections equivalent to a PHV in which the torque of the ICE is supplied directly to the driving wheel in a mechanical form, so that even when the vehicle is stationary or running at a slow speed, i.e., regardless of the vehicle speed, the power transmission efficiency from the ICE to the driving wheel is enhanced. Thus, fuel consumption and emissions are reduced.

Furthermore, use of either SHV mode or continuous-type PSHV mode may be controlled by either the vehicle driver or based on the SOC of the accumulator. For example, it is preferable to force use of SHV mode when the SOC of the accumulator is below a prescribed value and force use of continuous-type PSHV mode when it exceeds the prescribed value. Since in SHV mode the SOC of the accumulator can be controlled on the same principle as the SHV, the SOC can be kept in or returned to the desired range by using the above-mentioned forced mode control, and the accumulator's service life can be extended.

Examples of the components for the mechanical connections between the on-board components are: the preferred torque distributing mechanism is a differential gear, lock-and-release mechanism is a clutch, and braking mechanism is a mechanical brake. The torque distributing mechanism has an input shaft and first and second output shafts. These shafts are respectively connected to the ICE, the first dynamo-electric machine and the second dynamo-electric machine to differentially distribute the torque provided at the input shaft to the first and second output shafts. Specifically, the torque distributing mechanism differentially distributes the torque of the ICE to the first dynamo-electric machine side and the second dynamo-electric machine and driving wheel side. The lock-and-release mechanism is provided between the second output shaft of the torque distributing mechanism and the second dynamo-electric machine, which is connected to the driving wheel, so that the mechanical connection between the ICE and the second dynamo-electric machine and driving wheel can be made or released according to a command. The braking mechanism stops the revolution of the second output shaft of the torque distributing mechanism according to a braking command.

Use of the above-mentioned mechanisms provides the following advantages.

First, when switching to a control mode in which the ICE and the first dynamo-electric machine are not required, e.g., when switching from continuous-type PSHV mode to SHV mode (or, a PEV mode, to be described afterward), it is preferable to send a command to the lock-and-release mechanism to disconnect the ICE and first dynamo-electric machine from the second dynamo-electric machine and driving wheel. Thus, components which lie on the torque distributing mechanism side of the lock-and-release mechanism do not serve as a load on the second dynamo-electric machine or the like, and a good efficiency HV can be obtained.

Second, when it is presumed that the second output shaft of the torque distributing mechanism will enter a free run state, e.g., when the ICE and first dynamo-electric machine are disconnected from the second dynamo-electric machine and driving wheel by the lock-and-release mechanism, a braking command can be sent to the braking mechanism to stop the revolution of the second output shaft of the torque distributing mechanism. Thus, the second output shaft of the torque distributing mechanism is prevented from entering a free run state when the continuous-type PSHV mode is switched to SHV mode or PEV mode.

Third, by controlling the rotation speed of the first dynamo-electric machine when the lock-and-release mechanism or the braking mechanism is operated, the lock-and-release mechanism and the braking mechanism can be prevented from causing any noticeable slip or friction, thereby extending their service lives and thus reducing costs. For example, before giving a command to the lock-and-release mechanism, the rotation speed of the first dynamo-electric machine can be controlled to synchronize the rotation speed of the second output shaft with that of the second dynamo-electric machine, so that the lock-and-release mechanism can be prevented from causing any noticeable slip or the like. Further, after giving a command to the lock-and-release mechanism to release the mechanical connection, the rotation speed of the first dynamo-electric machine can be controlled to make the rotation speed of the second output shaft substantially zero, and a braking command can be given to the braking mechanism when the rotation speed of the second output shaft has become substantially zero, thereby preventing the braking mechanism from causing any noticeable slip or the like. Prevention of any noticeable slip or friction allows the use of a lower-price clutches and brakes.

Fourth, the torque distributing mechanism is a mechanism to distribute the torque produced by the ICE to the first and second dynamo-electric machines. Therefore, when the electric power generated by the first dynamo-electric machine is varied, the rotation speed of the ICE and the torque produced by the ICE are varied accordingly, resulting in varying the torque supplied to the second dynamo-electric machine side, i.e., the driving wheel side, from the ICE through the torque distributing mechanism. As a result, in continuous-type PSHV mode, by operating the first dynamo-electric machine as a generator and controlling the electric power generated by it so that the required torque is distributed to the second output shaft, the required torque to meet the demand for acceleration or deceleration can be produced at the driving wheel. When the required torque is too high to be supplied solely by the ICE, it is preferable to suppress the variation power to be generated so that the increase in rotation speed of the ICE does not reach a significant level, thereby preventing the rotation speed of the ICE from changing steeply. This suppression of variation of the power to be generated by the ICE creates a shortage of torque, however, by operating the second dynamo-electric machine as a motor, the shortage can be compensated for. Thus, the ICE can be operated with low fuel consumption and emissions while meeting the demand for acceleration or deceleration.

Fifth, since the torque distributing mechanism is a mechanism to differentially distribute the torque produced by the ICE, the operation of the first dynamo-electric machine as a generator produces a corresponding reaction force on the second output shaft. Therefore, in continuous-type PSHV mode, by operating the first dynamo-electric machine as a very small power generator, for example, when no acceleration is required, the torque distributing mechanism can distribute to the second output shaft torque to simulates the creeping torque which appears, for example, in a conventional ICE vehicle with an automatic transmission. Thus, a drive feeling identical to an automatic transmission vehicle (AT vehicle) can be realized and drivers sho are familiar with AT vehicles will be satisfied.

The control modes for the invention are not limited to only SHV mode and continuous-type PSHV mode. For example, a PEV mode may be used in which the ICE and first dynamo-electric machine can be disconnected from the second dynamo-electric machine and driving wheel, so that the torque produced by operating the second dynamo-electric machine as a motor is used to drive the vehicle, and the operation of the ICE and the first dynamo-electric machine can be stopped. In PEV mode, the vehicle can be driven with less noise and less pollution than conventional ICE vehicles and HVs.

DETAILED DESCRIPTION OF THE PREFERRED EMBODIMENTS

Figure 8:
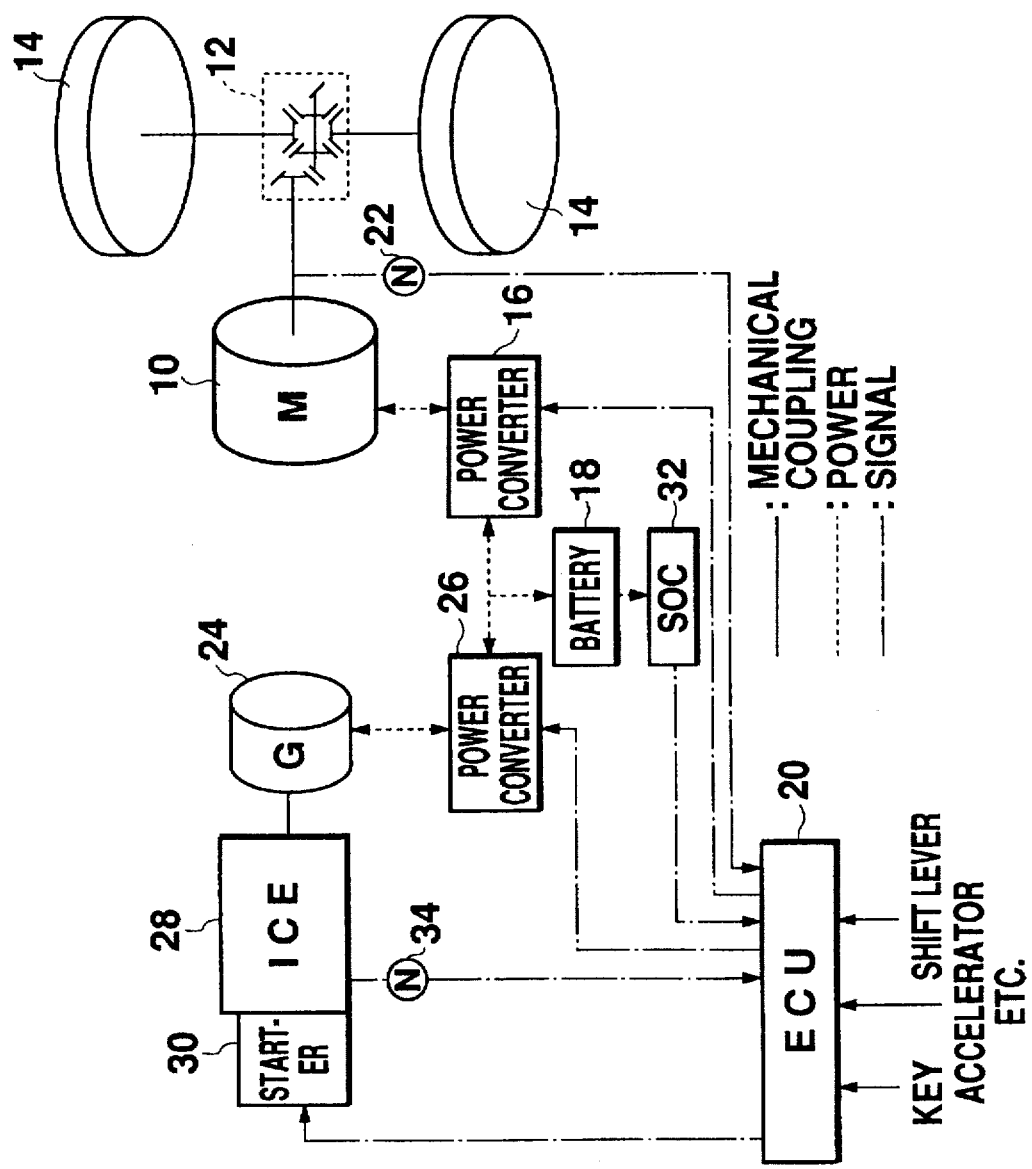
FIG. 8 is a block diagram showing a conventional configuration of an SHV.
Figure 9:
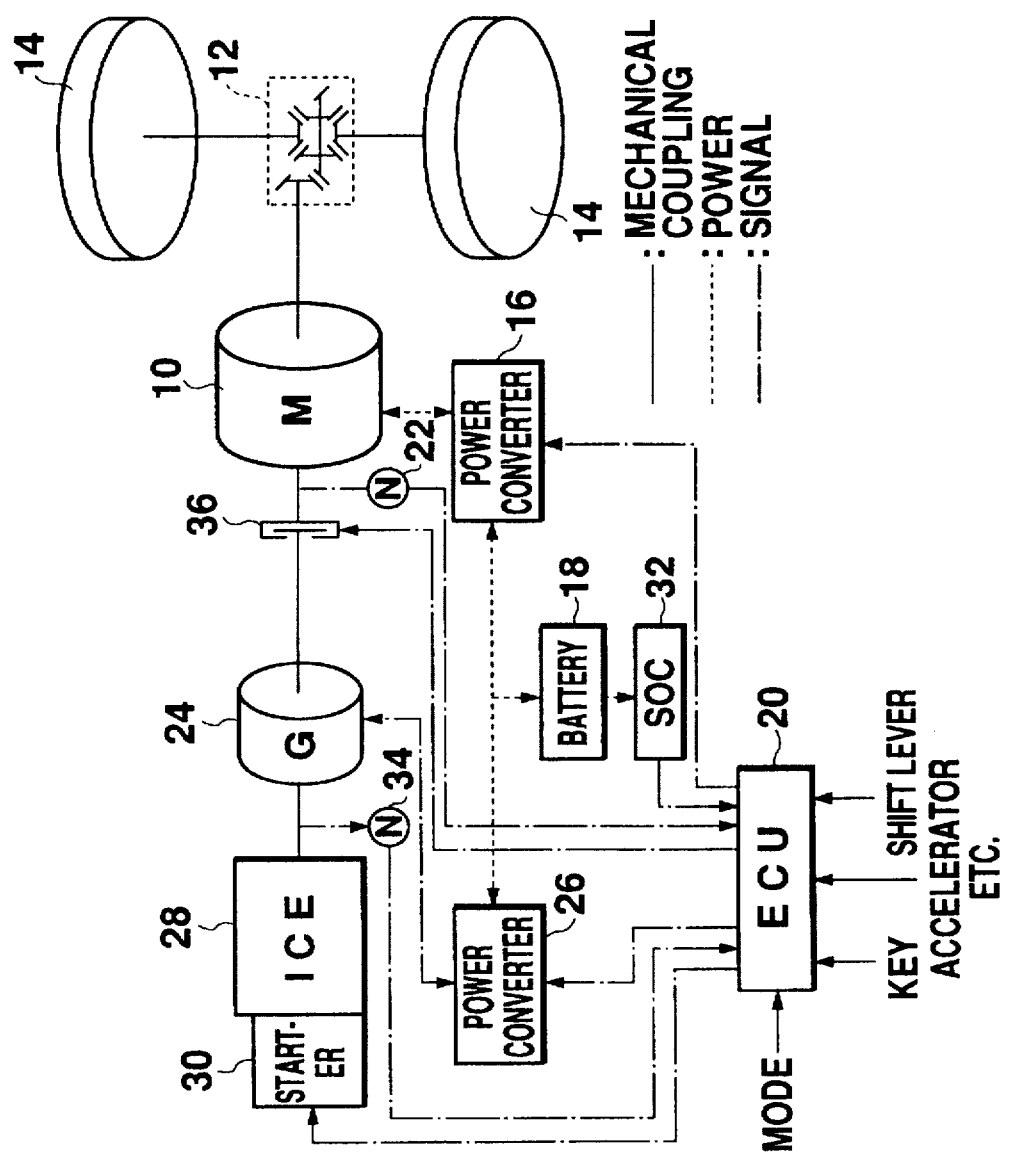
FIG. 9 is a block diagram showing a conventional configuration of a changeover-type PSHV.

Preferred embodiments of the invention will be described with reference to the accompanying drawings. To clarify the differences from a conventional SHV changeover-type PSHV, reference numerals to be used in the following description are the same as those used in FIG. 8 and FIG. 9. However, the system configuration of the PSHV is not to be restricted by such related arts. It is to be understood that those skilled in the art may easily modify the configurations of the embodiments to be described below with reference to this specification and the accompanying drawings.

Figure 1:
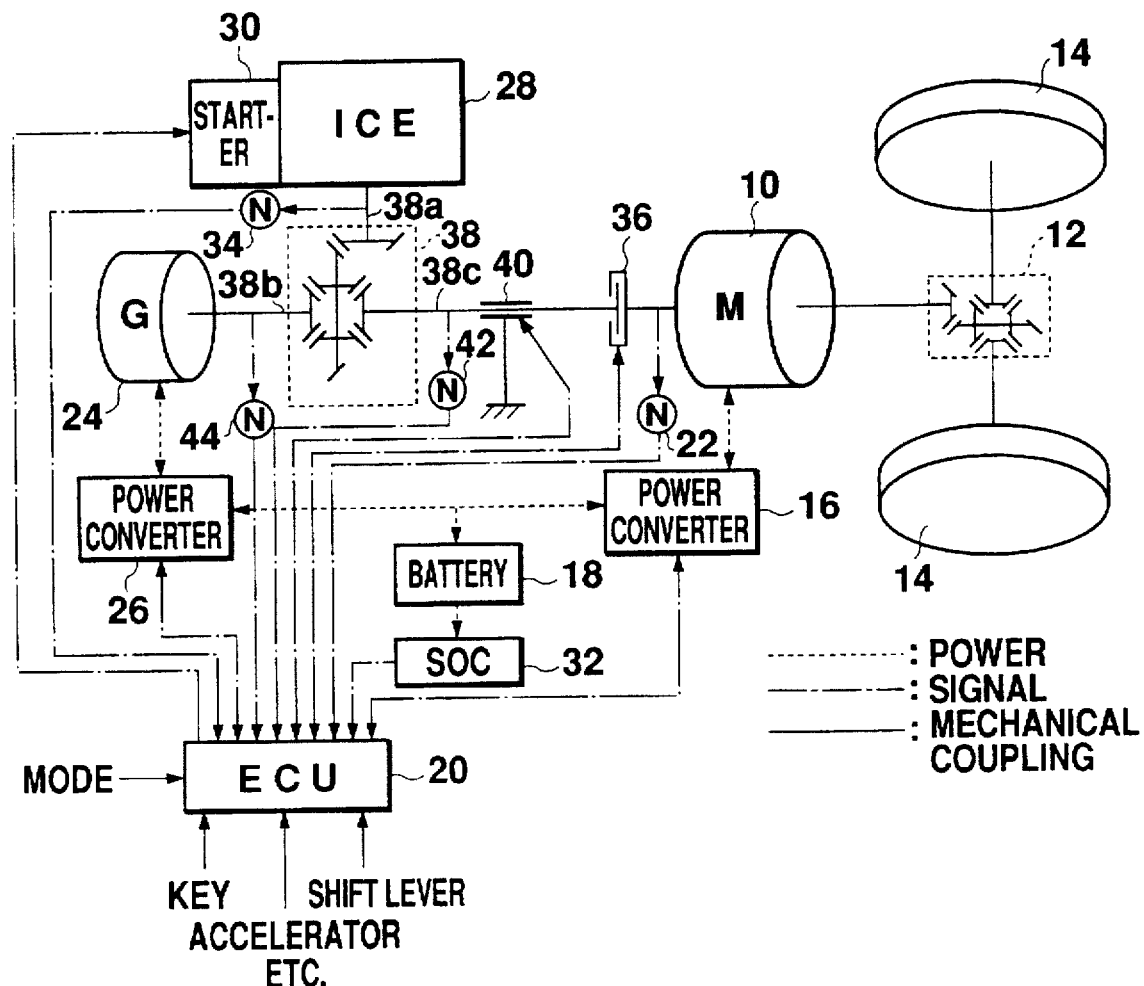
FIG. 1 is a block diagram showing the configuration of a PSHV according to one embodiment of the invention.

FIG. 1 shows the configuration of a PSHV according to one embodiment of the invention. The torque distributing mechanism 38 has shafts 38a to 38c. The torque distributing mechanism 38 is a mechanism to distribute torque applied to the input shaft 38a to the output shafts 38b, 38c. The input shaft 38a is connected to the rotating shaft of an ICE 28, the output shaft 38b to the rotating shaft of a generator 24, and the output shaft 38c to the rotating shaft of a motor 10. Therefore, in the PSHV of FIG. 1, the output torque of the ICE 28 is distributed to the generator 24 side and driving wheels 14 side by means of the torque distributing mechanism 38, so that the output of the ICE 28 can be transmitted to the driving wheels 14 even when the vehicle is stationary or running at a low speed. This is to remedy the above-described disadvantage of the changeover-type PSHV, shown in FIG. 9, in which the power transmission efficiency is low because the clutch 36 cannot be engaged when the vehicle is stationary or running at a low speed. The PSHV of FIG. 1 can provide good power transmission efficiency at substantially any speed. The torque distributing mechanism 38 is preferably a differential distributing mechanism such as a differential gear, which varies the torque of the output shaft 38c as the torque of the output shaft 38b varies.

Figure 2:
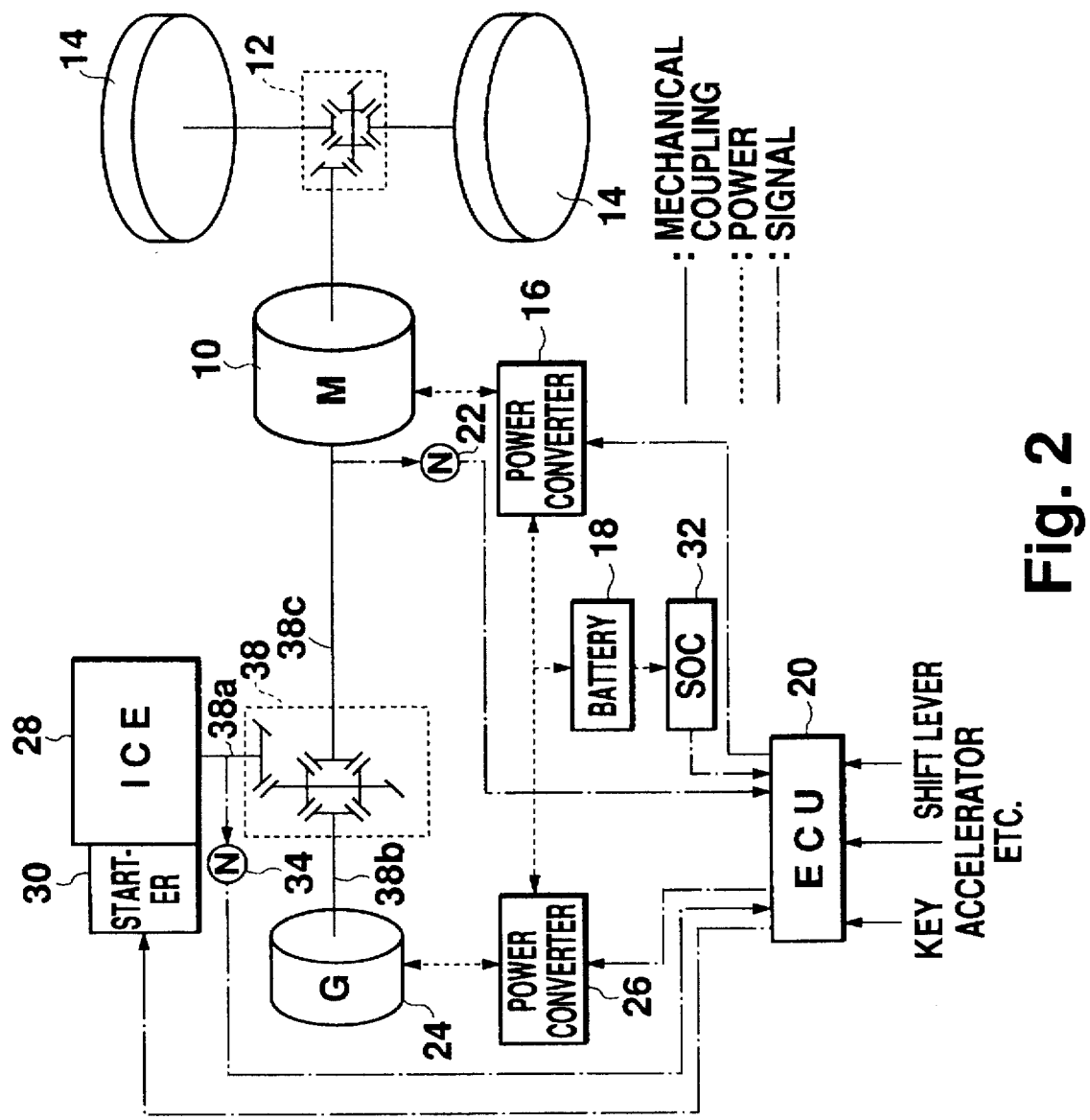
FIG. 2 is a block diagram showing a preliminary configuration of a PSHV as a reference.

The torque distributing mechanism 38 is a first characteristic component member of the PSHV of FIG. 1. However, the provision of this torque distributing mechanism 38 causes additional disadvantages for the control of the SOC range and service life of battery 18. More specifically, in a mode in which the output torque of the ICE 28 is always transmitted to the driving wheels 14 through the torque distributing mechanism 38 as shown in FIG. 2 (hereinafter referred to as continuous-type PSHV to distinguish from changeover-type PSHV), when the vehicle is stationary, the ICE 28 must be idled to prevent the power from being transmitted to the driving wheels 14, and the generator 24 must be stopped. In other words, in FIG. 2, when the vehicle is not running, the battery 18 cannot be recharged by the generated power of the generator 24, and it is difficult to keep the SOC of the battery 18 within a desired range. On the contrary, in the SHV of FIG. 8 and the changeover-type PSHV of FIG. 9 the ICE 28 and the driving wheels 14 are either not connected mechanically or the mechanical connection between them can be released and thus the battery 18 can be recharged by the generated power of the generator 24 even when the vehicle is stationary. This disadvantage of the continuous-type PSHV of FIG. 2 could not be overlooked. In addition, when the continuous-type PSHV of FIG. 2 is driven with the ICE 28 stopped, the torque distributing mechanism 38, the generator 24 and the ICE 28 serve as loads on the motor 10, resulting poor efficiency.

A second characteristic component member of the PSHV of FIG. 1 is the clutch 36 which is provided between the output shaft 38c of the torque distributing mechanism 38 and the rotating shaft of the motor 10 and which is controlled by an ECU 20. When the output shaft 38c and the rotating shaft of the motor 10 are mutually connected by the clutch 36, the PSHV of FIG. 1 enters a component-to-component connected state similar to the continuous-type PSHV of FIG. 2 (continuous-type PSHV mode). When the connection between the output shaft 38c and the rotating shaft of the motor 10 is released by the clutch 36, the PSHV of FIG. 1 enters a component-to-component connected state similar to the SHV of FIG. 8 (SHV mode). Thus, the PSHV of FIG. 1 can be switched from continuous-type PSHV mode to SHV mode, and vice versa, by controlling the clutch 36. In particular, in SHV mode, since the ICE 28, generator 24 and torque distributing mechanism 38 can be disconnected from the motor 10 and driving wheels 14, the battery 18 can be recharged by the generated power from the generator 24 even when the vehicle is stationary. And, the vehicle can be driven with the ICE 28 stopped without applying any extra load on the motor 10. In other words, since switching between continuous-type PSHV mode and SHV mode is possible, the PSHV of FIG. 1 can achieve both the advantages of the continuous-type PSHV, such as high power transmission efficiency at all speeds, and the SHV, such as good SOC control capacity and higher efficiency when the ICE 28 is stopped.

A third characteristic component of the PSHV of FIG. 1 is a braking mechanism (e.g., a mechanical brake) 40 provided between the output shaft 38c of the torque distributing mechanism 38 and the clutch 36. Specifically, when the clutch 36 releases, for example, to switch from continuous-type PSHV mode to SHV mode, the output shaft 38c enters a free run state and the braking mechanism 40 stops the output shaft 38c according to a command from the ECU 20 to minimize any free run.

A fourth characteristic component member of the PSHV of FIG. 1 is the ECU 20 which responds to mode commands, key signals, accelerator signals, brake signals, shift signals or the like given by the vehicle driver, monitors the outputs of rotation sensors 22, 34, 42, 44 and SOC sensor 32, and controls the clutch 36 and the braking mechanism 40 in addition to power components such as power converters 16, 26, ICE 28, starter 30 and generator 24. Specifically, various advantages of the PSHV of FIG. 1 are realized not only by the arrangement of the respective components but also by the control procedures performed by the ECU 20. These advantages can be achieved inexpensively. The rotation sensors 42, 44 detect the rotation speed of the output shafts 38b, 38c, respectively.

The operation of the ECU 20 in the PSHV of FIG. 1 will now be described. First, it should be noted that the operation of the ECU 20 can be switched according to a running mode set by the vehicle driver or another controller. In addition to the above-described continuous-type PSHV mode and SHV mode, the running mode could include a PEV mode in which vehicle drive power is produced only by the motor 10 with the ICE 28 stopped. In PEV mode the running conditions are the same as for a PEV. Specifically, the vehicle can be driven with no noise and no emissions from the ICE 28. Therefore, the PEV mode is suitable in a residential area at nighttime, a school district or a specified protected environment where a quiet environment is required, or the center of an overcrowded city suffering from heavy air pollution. PEV mode is also suitable for drivers, who for any other reason, decide, "I want to run the ICE 28 as little as possible." As described above, since the mechanical connection is released by the clutch 36 in PEV mode, the ICE 28, the generator 24 and the torque distributing mechanism 38 do not cause a load on the motor 10, which prevents the efficiency from being lowered by these loads.

Figure 3:
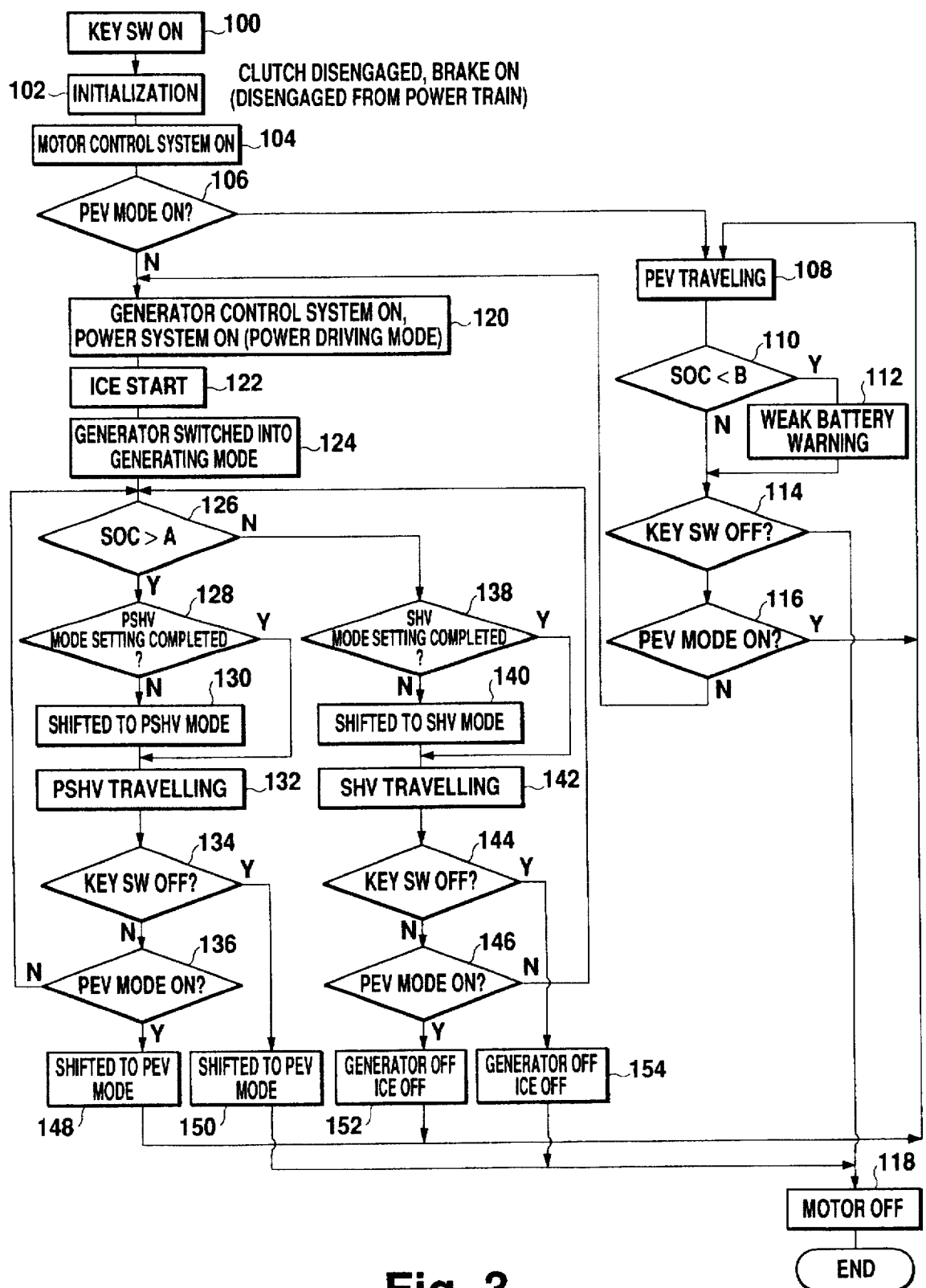
FIG. 3 is a flowchart showing the general operation of the ECU in the embodiment of FIG. 1.

As shown in FIG. 3, when the key switch is turned on by the vehicle driver (100), the ECU 20 performs a prescribed initialization (102). The initialization includes the operation to give a signal to the clutch 36 to release the connection between the motor 10 and the torque distributing mechanism 38, and the operation to give a signal to the braking mechanism 40 at the same time to stop the rotation of the output shaft 38c. Thus, the ICE 28 and the generator 24 are mechanically separated from the motor 10, thereby providing a connected state allowing PEV mode and SHV mode running. Then, the ECU 20 starts to supply electricity to a circuit which is related to the control of the motor 10 (104).

The subsequent operation of the ECU 20 varies depending on which mode is selected by the vehicle driver. When PEV mode is selected (106), the ECU 20 controls the components for PEV mode (108). PEV mode control includes the detection of the acceleration or deceleration demanded of the vehicle in view of the accelerator pedal or brake pedal angle, the determination of the torque required to provide the demanded acceleration or deceleration, the detection of the rotation speed of the motor 10 by the rotation sensor 22, and the control of the power conversion by the power converter 16 with reference to the detected rotation speed to provide the required torque. In PEV mode (and SHV mode), the battery 18 is not recharged except by means of an external power source and regeneration by the motor 10. Accordingly, in PEV mode, an alarm is given to the vehicle driver as necessary to indicate if the SOC of the battery 18 is low (112). The condition for issuing the alarm is that the SOC value of the battery 18 detected by the SOC sensor 32 is below a prescribed threshold B (110). The alarm may be given by a lamp or a sound. The ECU 20 continues in PEV mode control until the key switch is turned off by the vehicle driver (114) or a command is given to switch from PEV mode to another mode (116). The ECU 20 cuts the supply of electricity to the motor 10 when the key switch is turned off (118). When switching from PEV mode to another mode, the process moves to step 120 in the same way as when a mode other than the PEV mode is selected in step 106.

In PEV mode and SHV mode (to be described below), the battery 18 can be prevented from being overcharged by using the mechanical loss of the ICE 28, the generator 24, and the torque distributing mechanism 38. For example, when the battery 18 is fully recharged or almost fully recharged and does not have enough capacity to receive the regenerated power which is supplied through the power converter 16, the motor 10 and the torque distributing mechanism 38 are temporarily connected by the clutch 36, and regeneration braking is performed by the motor 10. The braking energy regenerated by the motor 10 is consumed due to the mechanical loss of the ICE 28, the generator 24, and the torque distributing mechanism 38. As a result, regeneration braking can be performed without overcharging the battery 18 or recharging it to a similar level. Modifications necessary to implement this temporary connection control and forced power consumption is apparent to an ordinary person skilled in the art from the disclosure of the present application. The procedure for engaging the clutch 36, is described in steps 130 and 140.

When the vehicle driver selects a mode other than PEV mode (106, 116), the ECU 20 starts to supply electricity to a generator control system and a power system built in the power converter 26 in order to start the control of the generator 24 and the ICE 28 (120). The ECU 20, then, gives a signal to, for example, the starter 30 to start the ICE 28 (122), and sets the generator 24 to generating mode (124). Generating mode means the generator 24 is controlled in order to set the generated power at a prescribed target value. The generator 24 also has a speed control mode, in which, the generator 24 is controlled by the ECU 20 so that the rotation speed detected by the rotation sensor 44 reaches a prescribed target value. In the PSHV of FIG. 1, the ICE 28 is started by the starter 30, however, the generator 24 may also be used as a starter since it is operable as a motor.

After setting the generator 24 to generating mode, the ECU 20 determines whether the SOC of the battery 18, as detected by SOC sensor 32, exceeds a prescribed threshold A (126). The threshold A is set to a value slightly higher than the minimum value required to extend the service life of the battery 18. When the SOC is higher than the threshold A, the ECU 20 forces continuous-type PSHV mode (130), and controls the components so that the vehicle is driven in continuous-type PSHV mode (continuous-type PSHV mode control: 132). On the contrary, when the SOC is equal to or smaller than the threshold A, the ECU 20 forces SHV mode (140), and controls the components so that the vehicle is driven in SHV mode (SHV mode control: 142). The ECU 20 repeats step 126 and subsequent procedures unless the key switch is turned off or PEV mode is selected.

For example, if the SOC is initially higher than the threshold A, the ECU 20 enters continuous-type PSHV mode (130, 132), and in this state, when the motor 10 is operated under a high load for a certain period or the vehicle is left standing with the motor 10 on for a long period, the SOC of the battery 18 lowers as a result of discharge, establishing a condition in which SOC≦A. In response thereto, the ECU 20 shifts to SHV mode (140, 142). In SHV mode, since the ICE 28 is not mechanically connected to the driving wheels 14, the ICE 28 can be operated to increase the SOC of the battery 18 regardless of the required acceleration or deceleration of the vehicle. Therefore, the SOC of the battery 18 can be increased. As a result, when the SOC reaches a level which is higher than the threshold A, the ECU 20 shifts to continuous-type PSHV mode again (130, 132).

Thus, since the control mode is set based on the SOC such that the output of the ICE 28 is used as necessary for recharging the battery 18, the SOC of the battery 18 can be properly controlled. When SOC>A and the mode is continuous-type PSHV mode (128) or SOC≦A and the mode is SHV mode (138) steps 130, 140 can be omitted.

When the key switch is turned off (134, 144), the ECU 20 performs the PEV mode switching procedure (150) if the final mode was PSHV mode, or stops the generator 34 and the ICE 28 (154) if the final mode was SHV mode, then moves to the motor stopping step (118). When the PEV mode is selected (136, 146), the ECU 20 performs the PEV mode switching procedure (148) if the mode is PSHV mode, or stops the generator 34 and the ICE 28 (152) if the mode is SHV mode, then enters PEV mode (108). Thus, the PEV mode switching procedure is required even if the previous mode is continuous-type PSHV mode, because in continuous-type PSHV mode, a connection is made by the clutch 36, and the release of the clutch 36 and the braking control of the braking mechanism 40 are required. On the contrary, when the previous mode is SHV mode, it is sufficient to simply stop the generator 34 and the ICE 28 because the connection of the clutch 36 has already been released in SHV mode, and the clutch 36 and the braking mechanism 40 need not be operated.

Figure 4:
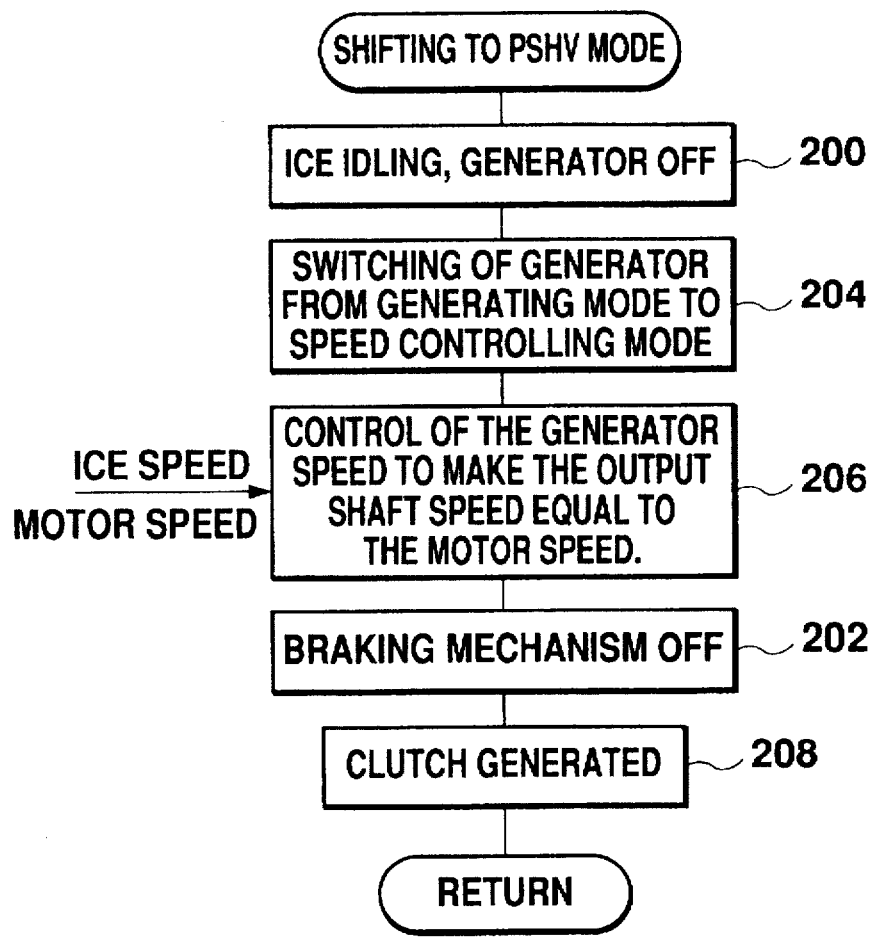
FIG. 4 is a flowchart showing a sequence for switching to continuous-type PSHV mode in the embodiment of FIG. 1.

Specifically, the preferable continuous-type PSHV mode switching procedure (130) is shown in FIG. 4. The ECU 20 controls the rotation speed of the ICE 28 to the idling level while receiving feedback from the output of the rotation sensor 34, and at the same time stops power generation by the generator 24 by releasing excitation (200). In this state, the ICE 28 is being operated with an energy consumption equivalent to the mechanical loss of the generator 24. The ECU 20, then, releases the output shaft 38c from the braking mechanism 40 to allow it to rotate (202). Prior to step 202, however, the ECU 20 switches the mode of the generator 24 from generating mode to speed control mode (204), and controls the rotation speed of the generator 24, with reference to the output of each rotation sensor (206), so that the rotation speed of the output shaft 38c, as detected by rotation sensor 42, becomes equal to that of the motor 10, as detected by rotation sensor 22, after performing step 202. After synchronizing the rotation of the output shaft 38c with that of the motor 10, the ECU 20 restores the connection between the torque distributing mechanism 38 and the motor 10 by using the clutch 36 (208). Thus, a state is entered in which the mechanical power produced by the ICE 28 is differentially distributed to the generator 24 and the motor 10 by the torque distributing mechanism 38, in other words, a state equivalent to that of a continuous-type PSHV.

In FIG. 4, the control of the rotation speed (206) prevents or decreases the amount the clutch 36 slips, or is abraded, damaged or the like. This also serves to decrease the required capacity of the clutch 36 and the operation energy of the actuator for driving it. Also, since a claw clutch can be used, the vehicle cost is decreased. Furthermore, this control of the rotation speed is feasible because the rotation speed of the generator 24 is a function of the rotation speed of the ICE 28 and that of the output shaft 38c and can be determined uniformly from the configuration of the torque distributing mechanism 38. In other words, the rotation sensor 42 can be omitted because the output of rotation sensors 34 and 44 can be used to calculate the rotation speed of the output shaft 38c. In this embodiment, to allow for failure checking of respective rotation sensors or the like, the rotation sensors are provided on respective shafts.

Figure 5:
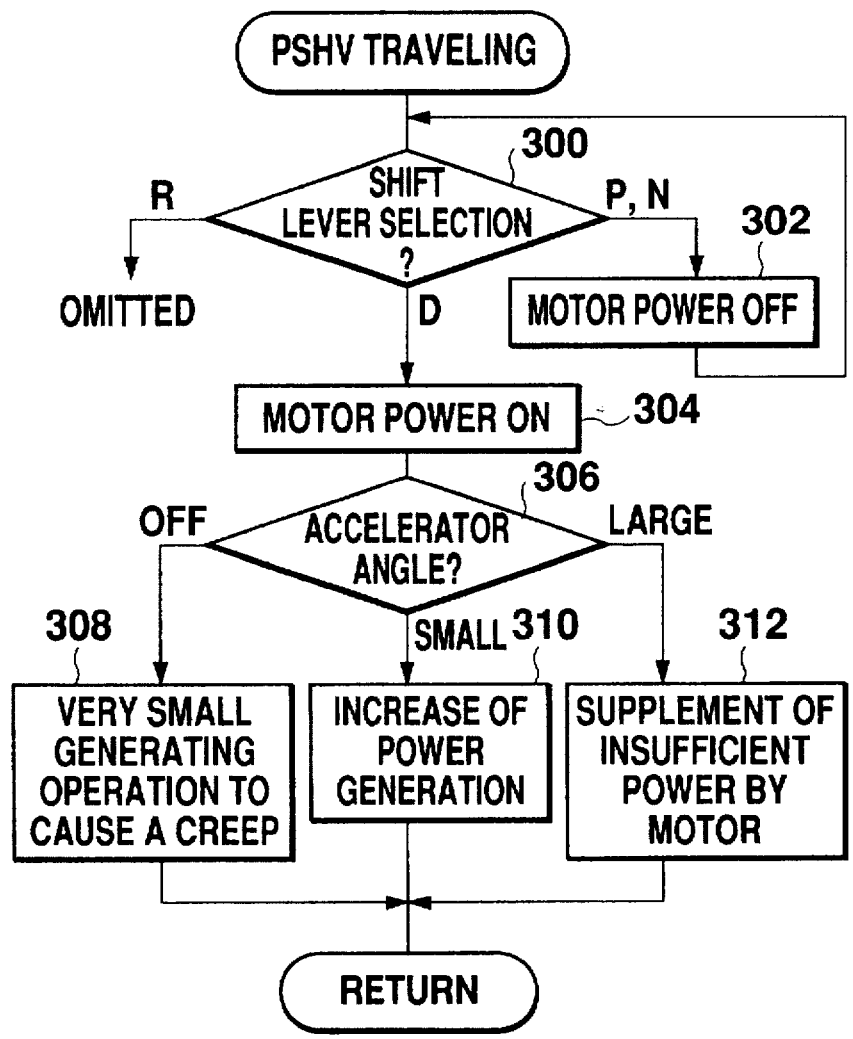
FIG. 5 is a flowchart showing a driving control sequence in the continuous-type PSHV mode in the embodiment of FIG. 1.

The preferable continuous-type PSHV mode control procedure (132) is shown in FIG. 5. The ECU 20 determines first the shift lever position (300). When the shift lever is positioned in P (Park) or N (Neutral), the ECU 20 cuts the supply of electricity to the motor 10 (302). When the shift lever is in a position such as D (Drive), which requires drive power, the ECU 20 supplies the motor 10 with electricity (304). The case in which the shift lever is positioned in R (Reverse) is not shown in the drawing, but the same control procedure as for a conventional ICE vehicle can be used, or the mode may be temporarily switched to SHV mode so that regeneration is used with priority.

When the shift lever is in a position such as D (Drive), requiring drive power, the ECU 20 also senses the accelerator pedal angle (306). When the accelerator pedal is not depressed at all, the ECU 20 controls the generator 24 so that a prescribed small amount of power is generated (308). This power generation produces torque sufficient to simulate the creeping torque in AT vehicle at the output shaft 38c. When the accelerator pedal is depressed, the ECU 20 determines the required electric power generation of the generator 24 according to the accelerator pedal angle, and controls the power converter 26 according to the target electric power generation (310). The rotation speed of the ICE 28 varies to absorb any difference between the rotation speed of the generator 24 corresponding to the target electric power generation and that of the motor 10, thereby increasing the torque distributed to the output shaft 38c according to the accelerator pedal angle. Further, if the change in accelerator pedal angle is too large for the torque to be supplied to the driving wheels 14 by the ICE 28 alone or when the change in accelerator pedal angle is too large for the torque to be supplied by the ICE 28 alone because fuel consumption and emission are degraded, the ECU 20 controls the power converter 16 to compensate by using the motor 10 for at least that part of the torque required at the driving wheels 14 which cannot be provided by the ICE 28 alone (312). Thus, the acceleration or deceleration can be suitably provided in response to a demand by the vehicle driver. When the brake pedal is depressed to stop the vehicle, the regeneration braking of the motor 10 may also be used to assist the decelerating operation. This control can be substantiated by adding logic concerning a hydraulic pressure of the braking mechanism 40 to the logic in step 306, the modifications necessary thereto are apparent to an ordinary person skilled in the art from the disclosure of the present invention.

Figure 6:
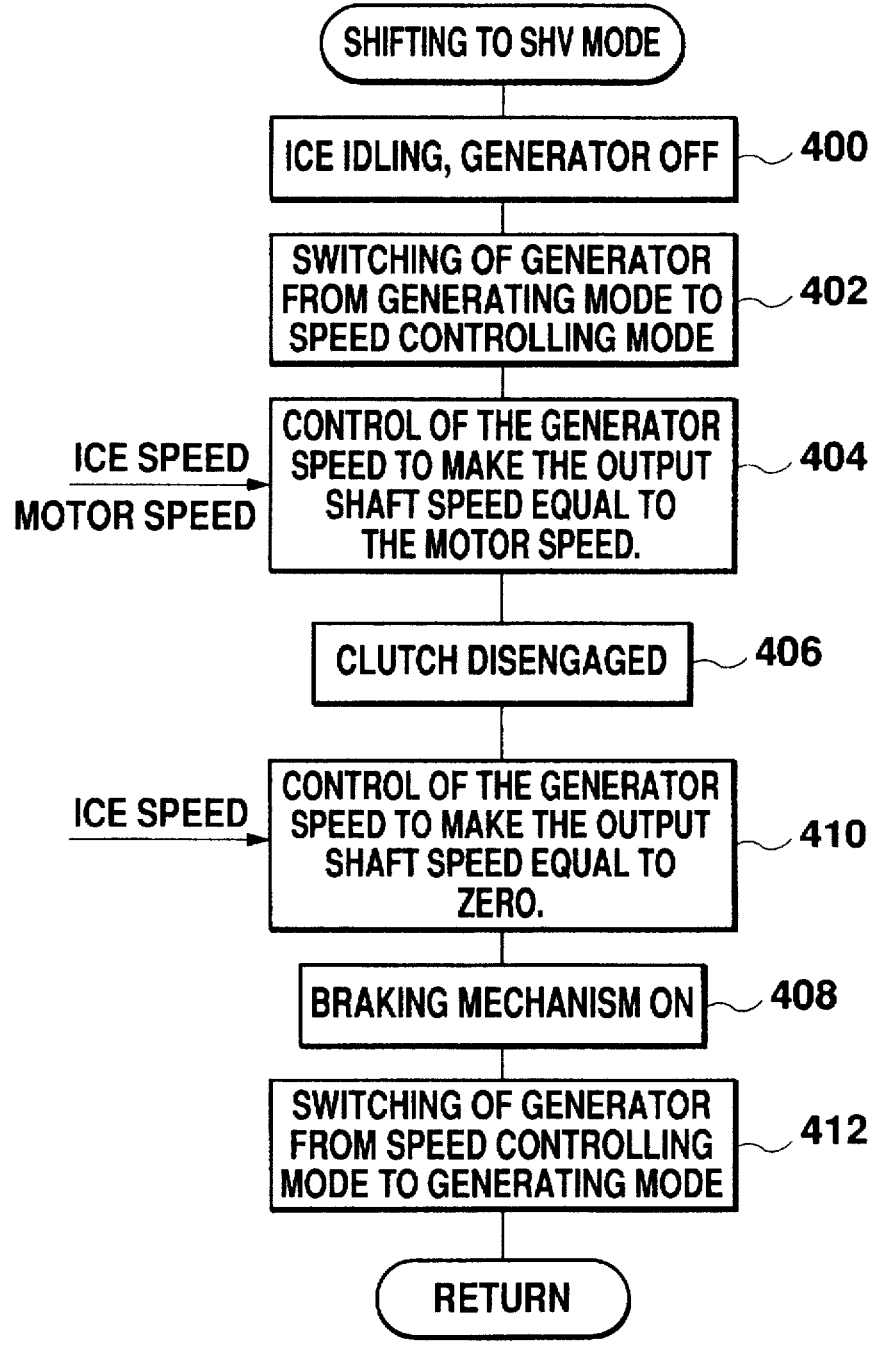
FIG. 6 is a flowchart showing a sequence for switching to SHV mode in the embodiment of FIG. 1.

The preferable SHV mode switching procedure (140) is shown in FIG. 6. The ECU 20 first makes the ICE 28 idle and stops power generation by the generator 24 (400), then switches the mode of the generator 24 from generation mode to speed control mode (402). Then, the ECU 20 refers to the output of each rotation sensor to control the rotation speed of the generator 24 so that the rotation speed of the output shaft 38c, as detected by the rotation sensor 42, is made equal to that of the motor 10, as detected by the rotation sensor 22 (404). After controlling to synchronize the rotation speed of the output shaft 38c with that of the motor 10, the ECU 20 controls the clutch 36 to releases the connection (406). Thus, the connections among the respective components corresponding to a continuous-type PSHV is switched to the connections corresponding to an SHV. This revolution control (404) operates in the same way as in the aforementioned revolution control (204) to prevent or decrease the amount the clutch 36 slips or is abraded or damaged.

Releasing the connection by means of the clutch 36, the ECU 20 also controls the braking mechanism 40 to stop the revolution of the output shaft 38c (408), thereby preventing the output shaft 38c from entering free run state and thus, prevent the ICE 28 from overrunning. At the same time, the ECU 20 uses the rotation speed of the ICE 28 as a reference to control the rotation speed of the generator 24 such that the rotation speed of the output shaft 38c is reduced (410). By doing so, the amount of slipping, abrasion or damage to the braking mechanism is lessened. Because of this, the required capacity of the braking mechanism 40 is reduced, and the operation energy of the actuator for driving it is also reduced. Also, since a claw-type braking mechanism can be used for the clutch 36 and the braking mechanism 40, the vehicle cost can be decreased. After completing the above series of steps, the ECU 20 switches the generator 24 from speed control mode back to generation mode (412).

The SHV mode control procedure (142) can be the same as that used for a conventional SHV. In SHV mode, the SOC of the battery 18 can be controlled at all speeds in the same way as a conventional SHV.

Figure 7:
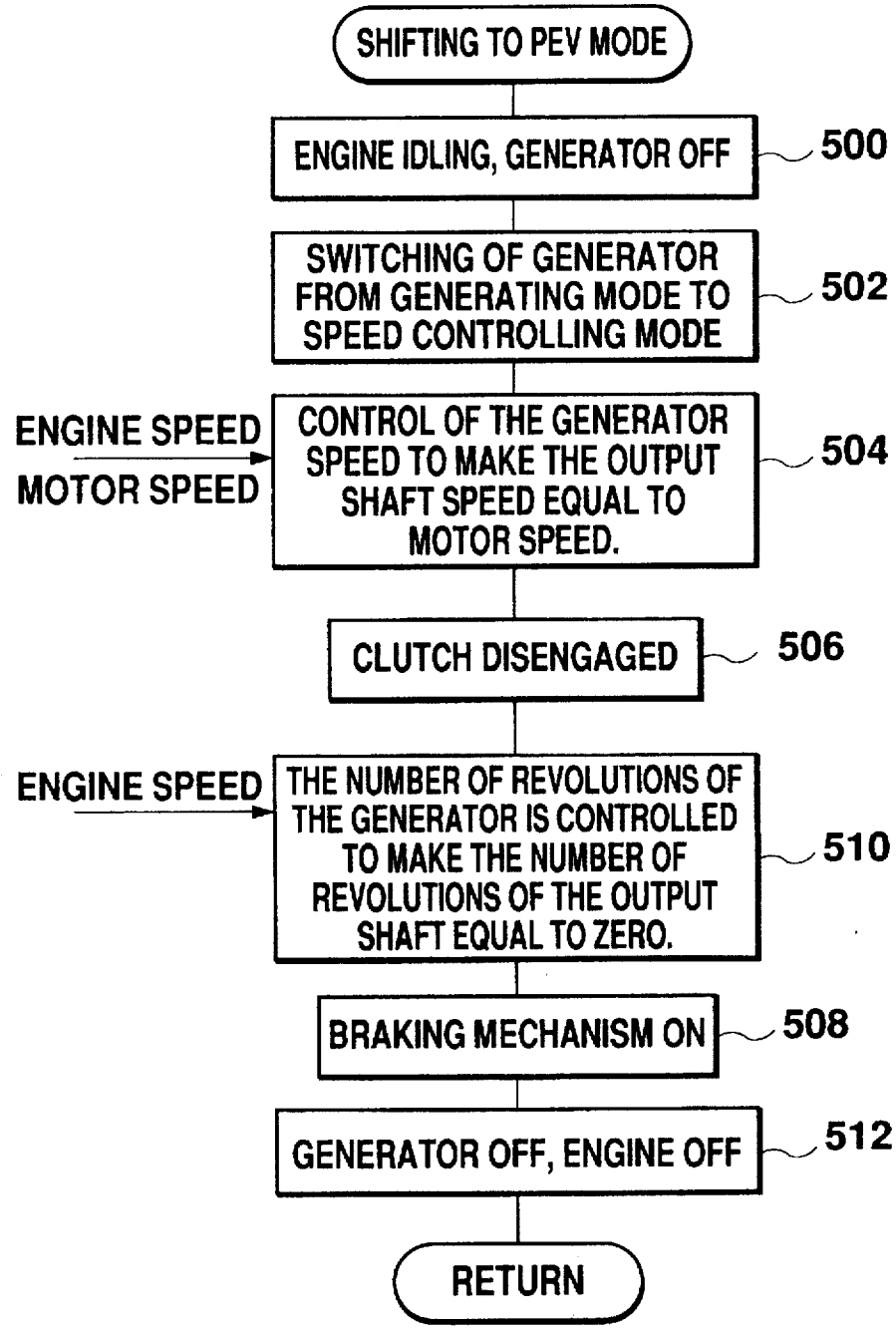
FIG. 7 is a flowchart showing a sequence for switching to PEV mode in the embodiment of FIG. 1.

The preferable PEV mode switching procedure (148, 150) is as shown in FIG. 7. Steps 500, 502, 504, 506, 508 and 510 in FIG. 7 are the same as those of steps 400, 402, 404, 406, 408 and 410 in FIG. 6. After completing step 508, the ECU 20 stops the operation of the generator 24 and the ICE 28 (512). Thus, to switch from PSHV mode to PEV mode or to stop the motor 10, a procedure similar to the one used to switch from PSHV mode to SHV mode is performed, thereby attaining the above-mentioned effect of decreasing any slipping, etc. of the clutch 36 and the braking mechanism 40.

As described above, in this embodiment, the connections among the on-board respective components can be switched between connections equivalent to a continuous-type PSHV and connections equivalent to an SHV, so that it can achieve both the advantage of the SHV, good control of the SOC of the battery 18, and the advantage of the "pure" continuous-type PSHV of FIG. 2, high power transmission efficiency at all speeds. And, the above advantages can be achieved by adding components such as clutch 36 and braking mechanism 40 to a conventional continuous-type PSHV and modifying the controlling procedures of the ECU 20, so that development costs are relatively low.

When the connections among the respective components is the same as that of an SHV, the vehicle can also be run as a PEV as required by the vehicle driver. At this time, if the torque distributing mechanism 38 and the motor 10 are connected by the clutch 36, regeneration braking can be used to prevent the battery 18 from being overcharged. Further advantage include that the torque required to produce a creeping effect can be produced by the generator 24. In addition, the ICE 28 and the generator 24 can be controlled simultaneously and the braking mechanism 40 also controlled as the clutch 36 is engaged or disengaged, so that the above effects can be achieved by means of a clutch 36 and a braking mechanism 40 each having a small capacity, while still preventing the output shaft of the torque distributing mechanism 38 from entering a free run state. Also, the mode can be controlled such that if the SOC of the battery 18, as detected by the SOC sensor 32, is too low, PSHV mode is automatically switched to SHV mode, so that the SOC of the battery 18 does not lower significantly even when the vehicle is left standing for a long period with the ICE 28 kept running.

While there has been described what are at present considered to be preferred embodiments of the invention, it is to be understood that various modifications may be made thereto, and it is intended that the appended claims cover all such modifications as fall within the true spirit and scope of the invention.

What is claimed is:

1. A control method which is implemented in a hybrid vehicle which is provided with, at least, an internal combustion engine for producing power, first and second dynamo-electric machines each on a power transmission path from said internal combustion engine to a driving wheel and electrically connected to each other, and an accumulator electrically connected to said first and second dynamo-electric machines, and said control method comprising:

a first step for determining a control mode to be used from among multiple types of control modes including at least an SHV mode and a continuous-type PSHV mode, a second step for setting the state of said components so that the electrical connections and the mechanical connection among above-mentioned components conform with the control mode determined in the first step, and a third step for controlling the operation of above-mentioned components according to the control mode determined in the first step and set in the second step, said SHV mode being a mode in which, after mechanically disconnecting the internal combustion engine and the first dynamo-electric machine from the second dynamo-electric machine and the driving wheel, said second dynamo-electric machine is operated as a motor and torque obtained by the motor is used to drive the vehicle, and if necessary, said first dynamo-electric machine is operated as a generator driven by said internal combustion engine, and said continuous-type PSHV mode being a mode in which after mechanically connecting said internal combustion engine and first dynamo-electric machine to said second dynamo-electric machine and the driving wheel, the torque produced by said internal combustion engine is used in the mechanical form to drive the vehicle, and if necessary, said first dynamo-electric machine is operated as a generator to be driven by said internal combustion engine and said second dynamo-electric machine is operated as a motor or a generator.

2. The control method according to claim 1, wherein said first step includes a determination to use said SHV mode when the state of charge of the accumulator is below a prescribed value and said continuous-type PSHV mode when the state of charge exceeds the prescribed value.

3. The control method according to claim 1, wherein said hybrid vehicle is further provided with:

a torque distributing mechanism which has an input shaft and first and second output shafts and differentially distributes the torque applied to said input shaft to the first and second output shafts; said input shaft and the first and second output shafts being respectively connected to said internal combustion engine, said first dynamo-electric machine and a lock-and-release mechanism; and said lock-and-release mechanism which mechanically connects or disconnects the internal combustion engine and the first dynamo-electric machine to or from the second dynamo-electric machine and the driving wheel, according to a command.

4. The control method according to claim 3, wherein said second step comprises:

a step for supplying the command to said lock-and-release mechanism according to the control mode determined in the first step, and a step for controlling, before supplying the command to said lock-and-release mechanism, a rotation speed of said first dynamo-electric machine to synchronize a rotation speed of said second output shaft with that of said second dynamo-electric machine.

5. The control method according to claim 3, wherein said hybrid vehicle is provided with a braking mechanism for stopping the revolution of said second output shaft according to a braking command; and said second step comprises:

a step for supplying the command to said lock-and-release mechanism according to the control mode determined in the first step, a step for controlling, after supplying the command to said lock-and-release mechanism to mechanically disconnect the internal combustion engine and the first dynamo-electric machine from the second dynamo-electric machine and the driving wheel, a rotation speed of said first dynamo-electric machine to make a rotation speed of said second output shaft substantially zero, and a step for supplying the braking command to said braking mechanism after the rotation speed of said second output shaft has become substantially zero.

6. The control method according to claim 3, wherein said third step includes a step for operating said first dynamo-electric machine as a generator having a very small power to distribute torque necessary for simulating creeping to said second output shaft when the control mode determined in the first step is said continuous-type PSHV mode.

7. The control method according to claim 3, wherein said third step includes a step for, when the control mode determined in the first step is said continuous-type PSHV mode, operating said first dynamo-electric machine as a generator and for controlling a generated power of the first dynamo-electric machine according to required torque so that torque corresponding to the required torque to be supplied to said driving wheel is distributed to said second output shaft.

8. The control method according to claim 7, wherein said third step includes a step for, when the control mode determined in the first step is said continuous-type PSHV mode, operating said second dynamo-electric machine as a motor to prevent a rotation speed of said internal combustion engine from being increased steeply or substantially when the required torque is actually distributed to said second output shaft.

9. The control method according to claim 1, wherein said multiple types of control modes include a PEV mode;

said PEV mode being a mode in which, after mechanically disconnecting the internal combustion engine and the first dynamo-electric machine from the second dynamo-electric machine and the driving wheel, said second dynamo-electric machine is operated as a motor to generate a torque to drive the vehicle while said internal combustion engine and said first dynamo-electric machine are stopped.

10. A hybrid vehicle comprising:

an internal combustion engine for producing power in the form of a torque;

a first dynamo-electric machine which is operable at least as a generator;

an accumulator which is recharged with a generated power of said first dynamo-electric machine;

a second dynamo-electric machine which is operable at least as a motor when supplied with at least of the generated power of said first dynamo-electric machine and a discharged power from said accumulator;

a torque distributing mechanism for differentially distributing the torque produced by said internal combustion engine to a side of the first dynamo-electric machine and a side of a driving wheel and second dynamo-electric machine; said second dynamo-electric machine assisting torque supplied from said internal combustion engine to said driving wheel when the torque from the internal combustion engine is being distributed through said torque distributing mechanism and supplying said driving wheel with torque generated by the second dynamo-electric machine when the torque from the internal combustion engine is not being distributed;

a lock-and-release mechanism for mechanically connecting or disconnecting said torque distributing mechanism to or from the second dynamo-electric machine;

a braking mechanism for stopping an output shaft, which is one of shafts included in said differential distributing mechanism so that the output shaft does not enter a free running state, the output shaft connecting the torque distributing mechanism to said lock-and-release mechanism and entering the free running state if a mechanical connection between said torque distributing mechanism and said second dynamo-electric machine were released without the stopping; and a controller for changing a control mode of said hybrid vehicle from a continuous-type PSHV mode to an SHV mode by controlling said lock-and-release mechanism and said braking mechanism so that the mechanical connection between said torque distributing mechanism and said second dynamo-electric machine is released and the revolution of said output shaft is stopped, said continuous-type PSHV mode being a mode for distributing torque produced by said internal combustion engine to said driving wheel and said first dynamo-electric machine, and said SHV mode being a mode for distributing the torque produced by said internal combustion engine to said first dynamo-electric machine only.

11. The hybrid vehicle according to claim 10, wherein when the control mode of said hybrid vehicle is said continuous-type PSHV mode and acceleration of the hybrid vehicle is not necessary, said controller causes said first dynamo-electric machine to generate a very small power so as to supply said driving wheel with torque simulating creeping.

12. The hybrid vehicle according to claim 10, wherein when said continuous-type PSHV mode is to be switched to said SHV mode, said controller makes said internal combustion engine idle and adjusts a rotation speed of said first dynamo-electric machine to synchronize a rotation speed of said output shaft to that of said second dynamo-electric machine, releases the mechanical connection between said torque distributing mechanism and said second dynamo-electric machine by said lock-and-release mechanism after synchronizing, adjusts the rotation speed of said first dynamo-electric machine to make the rotation speed of said output shaft substantially zero after releasing, and stopping the revolutions of said output shaft by the braking mechanism after zero control.

13. The hybrid vehicle according to claim 10, wherein said controller forces the control mode to switch from said continuous-type PSHV mode to said SHV mode when a state of charge of said accumulator is lowered to below a prescribed level.

* * * * *